US010357748B2

(12) United States Patent
Rozy et al.

(10) Patent No.: US 10,357,748 B2
(45) Date of Patent: Jul. 23, 2019

(54) MAGNETICALLY COUPLED MIXER WITH THRUST BEARING FRICTION CONTROL

(71) Applicant: ASEPCO, Mountain View, CA (US)

(72) Inventors: Yoram Rozy, Sunnyvale, CA (US); Mark R. Embury, Fremont, CA (US); Joseph Benjamin Morgan, Castro Valley, CA (US)

(73) Assignee: ASEPCO, Mountain View, CA (US)

( * ) Notice: Subject to any disclaimer, the term of this patent is extended or adjusted under 35 U.S.C. 154(b) by 334 days.

(21) Appl. No.: 14/229,371

(22) Filed: Mar. 28, 2014

(65) Prior Publication Data
US 2015/0273414 A1 Oct. 1, 2015

(51) Int. Cl.
B01F 7/00 (2006.01)
B01F 15/00 (2006.01)
B01F 13/08 (2006.01)
F16C 39/06 (2006.01)

(52) U.S. Cl.
CPC .......... B01F 7/001 (2013.01); B01F 7/00341 (2013.01); B01F 13/0872 (2013.01); B01F 15/00123 (2013.01); B01F 15/00487 (2013.01); F16C 39/066 (2013.01); B01F 2015/00597 (2013.01); B01F 2015/00649 (2013.01)

(58) Field of Classification Search
CPC .............. B01F 13/0827; B01F 13/0845; F16C 32/0417; F16C 39/066
USPC .......................... 366/273, 274, 286; 417/420
See application file for complete search history.

(56) References Cited

U.S. PATENT DOCUMENTS

| 4,167,295 | A | * | 9/1979 | Glaser | F16C 39/063 384/105 |
| 4,820,950 | A | | 4/1989 | Hijiya et al. | |
| 4,993,841 | A | | 2/1991 | Lofgren et al. | |
| 5,478,149 | A | | 12/1995 | Quigg | |
| 6,065,865 | A | * | 5/2000 | Eyraud | B01F 13/0827 366/273 |
| 6,206,562 | B1 | * | 3/2001 | Eyraud | B01F 13/0827 366/273 |
| 6,339,270 | B1 | | 1/2002 | Ichiyama | |

(Continued)

FOREIGN PATENT DOCUMENTS

DE 29709966 U1 8/1997
DE 29800818 U1 3/1998
(Continued)

Primary Examiner — Tony G Soohoo
Assistant Examiner — Elizabeth Insler
(74) Attorney, Agent, or Firm — Edward S. Wright

(57) ABSTRACT

Magnetically coupled mixer having an impeller magnetically coupled to a drive shaft and thrust bearings that support the impeller. The drive shaft can be moved along its axis, and an upwardly directed axial force is applied to the drive shaft to partially offset downward forces exerted by the impeller and thereby reduce friction between the thrust bearing surfaces while maintaining contact between them. In one disclosed embodiment, the force is applied to the drive shaft by a pair of magnets arranged so that the magnetic fields interact to produce the force, and the magnitude of the force is controlled by adjusting the distance between the magnets. The forces exerted by the impeller can be monitored and utilized in controlling the magnitude of the force applied to the shaft.

33 Claims, 4 Drawing Sheets

(56) References Cited

U.S. PATENT DOCUMENTS

| | | | |
|---|---|---|---|
| 6,675,877 B2* | 1/2004 | Sandu | ............ F28D 7/106 |
| | | | 165/91 |
| 7,086,778 B2 | 8/2006 | Terentiev | |
| 7,384,027 B2 | 6/2008 | Terentiev et al. | |
| 7,396,153 B2 | 7/2008 | Andersson | |
| 7,481,572 B2 | 1/2009 | Terentiev | |
| 2004/0076076 A1 | 4/2004 | Hoobyar et al. | |
| 2004/0241019 A1 | 12/2004 | Goldowsky | |
| 2006/0012258 A1* | 1/2006 | Sun | ............ F16C 39/066 |
| | | | 310/90.5 |

FOREIGN PATENT DOCUMENTS

| | | |
|---|---|---|
| DE | 10 2009 021 992 B3 | 12/2010 |
| EP | 1470856 A1 | 10/2004 |
| GB | 2185862 A | 7/1987 |
| WO | 2011049492 A1 | 4/2011 |

* cited by examiner

MAGNETICALLY COUPLED MIXER WITH THRUST BEARING FRICTION CONTROL

BACKGROUND OF THE INVENTION

Field of Invention

This invention pertains generally to mixers for aseptic liquids and, more particularly, to a magnetically coupled mixer with means for controlling friction between thrust bearings in the mixer.

Related Art

Magnetically coupled mixers are widely used for mixing liquids in sealed vessels. Such mixers typically have means for generating a rotating magnetic field outside the vessel and an impeller within the vessel which is coupled to the rotating field by magnets affixed to the impeller. With magnetic coupling, no drive shaft penetrates the vessel, and the problems associated with sealing around rotating shafts are avoided.

Magnetically coupled mixers heretofore provided do, however, have certain limitations and disadvantages. The impeller is commonly mounted on bearings which include thrust surfaces that rub together, producing friction, wear, and particles that can contaminate an otherwise sanitary environment within the vessel. While there have been some attempts to avoid such problems by levitating the impeller to separate the thrust bearing surfaces and keep them from contacting each other when the mixer is operating, that is not an entirely satisfactory solution because it gives rise to other problems, such as wobbling of the impeller.

OBJECTS AND SUMMARY OF THE INVENTION

It is, in general, an object of the invention to provide a new and improved magnetically coupled mixer for aseptic liquids.

Another object of the invention is to provide a mixer of the above character which overcomes the limitations and disadvantages of mixers heretofore provided.

These and other objects are achieved in accordance with the invention by providing a magnetically coupled mixer with an axially adjustable drive shaft and means for applying an upwardly directed axial force to the drive shaft to partially offset downward forces exerted by the impeller to reduce friction between the thrust bearing surfaces while maintaining contact between them. In the disclosed embodiments, the force is applied to the drive shaft by a pair of magnets arranged so that their magnetic fields interact to produce the force, and the magnitude of the force is controlled by adjusting the distance between the magnets. In some embodiments, the forces exerted by the impeller are monitored and utilized in determining the magnitude of the offsetting force.

DETAILED DESCRIPTION

Figure 1:
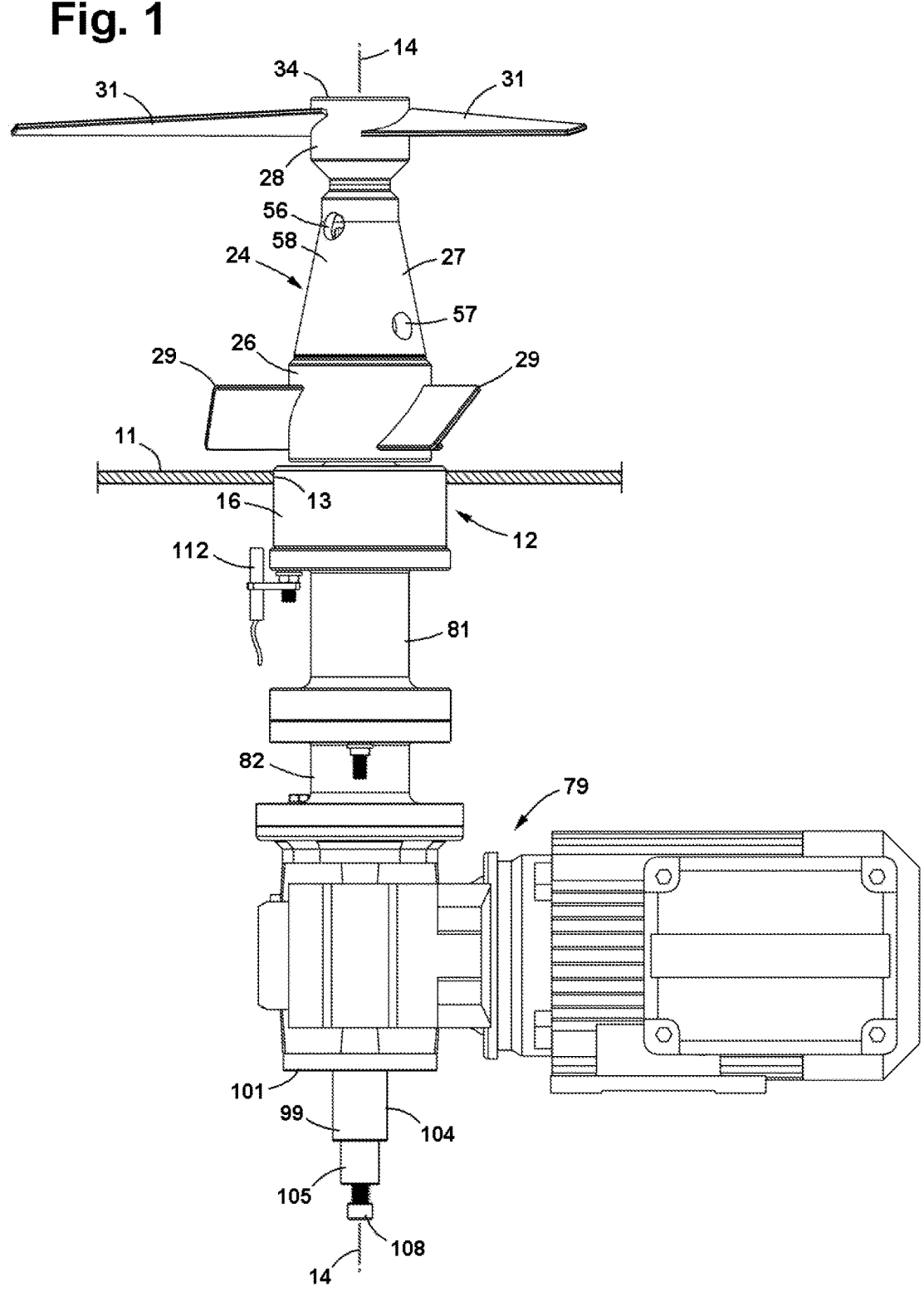
FIG. 1 is a side elevational view of one embodiment of a magnetically coupled mixer with thrust bearing friction control in accordance with the invention.
Figure 2:
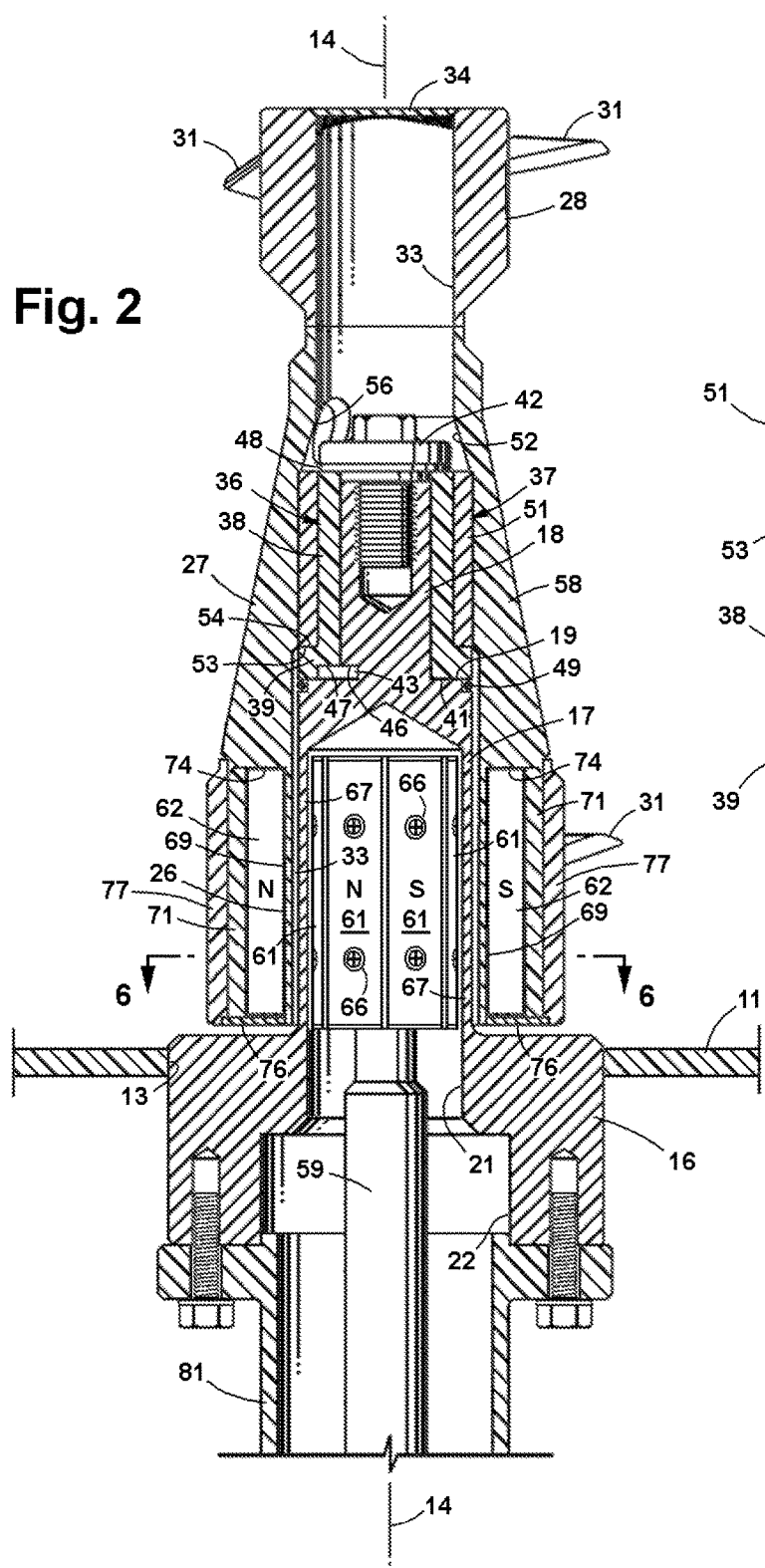
FIG. 2 is a fragmentary vertical sectional view of an upper portion of the embodiment of FIG. 1.
Figure 3:
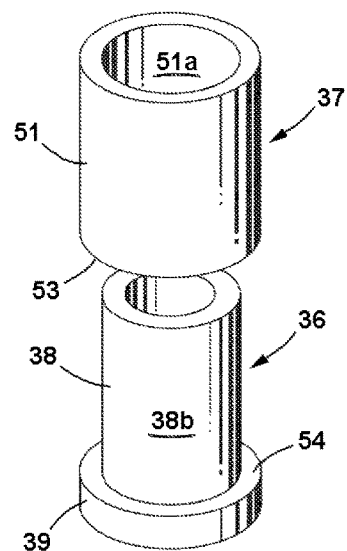
FIG. 3 is an exploded isometric view of the impeller bearings in the embodiment of FIG. 1.
Figure 4:
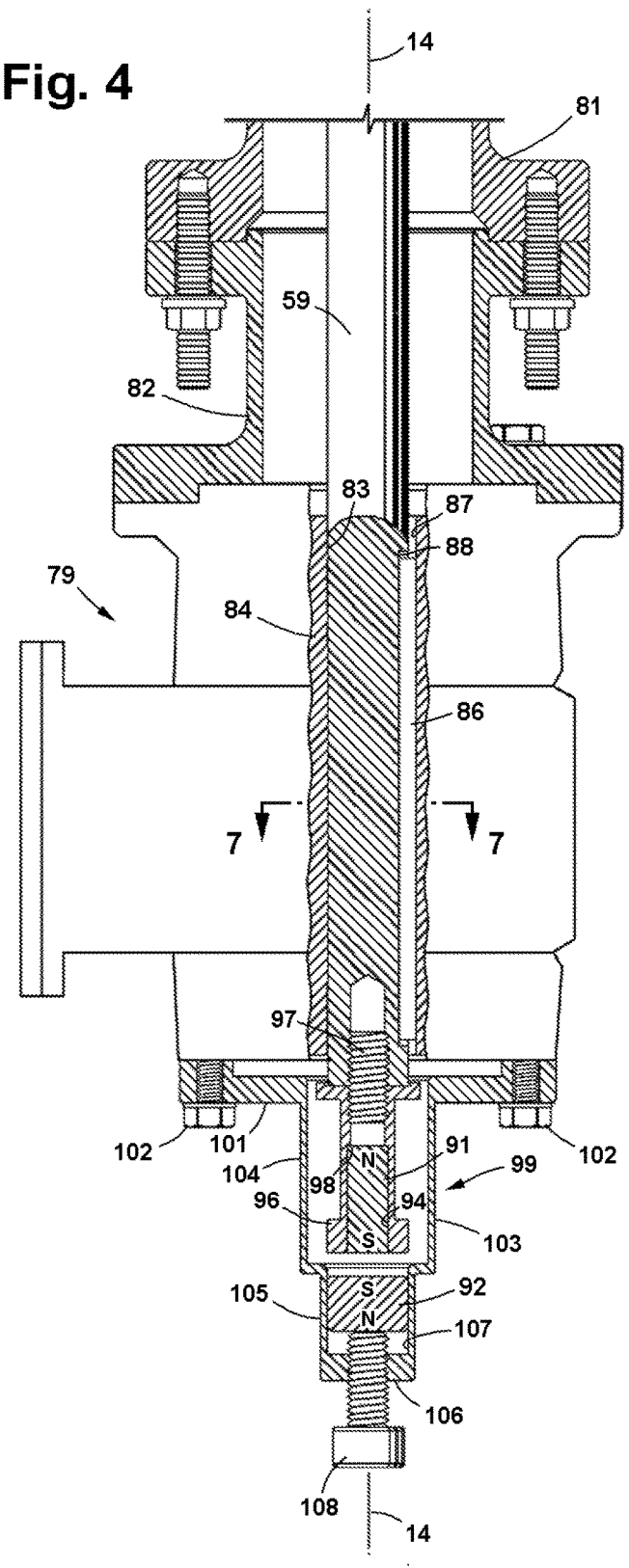
FIG. 4 is a fragmentary vertical sectional view of a lower portion of the embodiment of FIG. 1.

In the drawings, the mixer is illustrated in conjunction with the bottom wall 11 of a vessel or tank in which an aseptic liquid is stirred or mixed. The mixer includes an axially elongated, hollow base or post 12 which passes through an opening 13 in the wall and is centered about a vertically extending axis 14. The base is generally circular in horizontal section and is fabricated of a non-magnetic, non-corrosive material such as stainless steel. It has a lower section 16 which passes through opening 13 and is welded to the bottom wall of the vessel, a middle section 17 of lesser diameter than the lower section, and an upper section 18 of lesser diameter than the middle section, with an annular step or shoulder 19 between the middle and upper sections.

A circular bore 21 extends axially within the lower and middle sections of the base, with a counterbore 22 opening through the lower end of the base. The bore terminates toward the upper end of the middle section, and the upper section of the base is substantially solid.

An impeller assembly 24 is mounted on the upper section of the base for rotation about axis 14 to mix or stir the liquid in the vessel or tank. The impeller has a generally cylindrical lower section or hub 26, a conically tapered middle section 27, and a cylindrical upper section or hub 28, with mixing blades 29, 31 extending laterally from the two hubs. Like the base, the impeller assembly is fabricated of a non-magnetic, non-corrosive material such as stainless steel, and in the embodiment illustrated, the three sections are fabricated separately and welded together. An axial bore 33 extends through the three sections and is sealed at the top by a plug 34.

The impeller is rotatably mounted on the post by male and female sleeve bearings 36, 37. Male bearing 36 has a vertically extending cylindrical side wall 38 with a horizontally extending annular flange 39 at its lower end. It is mounted on the upper section 18 of the post, with the lower surface 41 of the bearing abutting against shoulder 19. The bearing is secured to the post by a flanged head screw 42 and prevented from rotating by a lock pin 43. The screw is threaded into the upper end of the post, with the flanged head bearing against the upper end of the bearing, and the lock pin is pressed into a radial bore hole 46 in the post and received in a radial slot 47 in the lower end of the bearing. O-rings 48, 49 provide seals between the top of the bearing and the head of the screw and between the bottom of the bearing and the post.

Female bearing 37 has a vertically extending cylindrical side wall 51 with an inner diameter corresponding to the outer diameter of side wall 38, a thickness corresponding to the width of flange 39, and an outer diameter corresponding to the diameter of bore 33. Bearing 37 is mounted in bore 33 in the middle section 27 of the impeller and is affixed to the impeller by suitable means such as press fitting in the bore. Toward the top of the middle section, the bore has a tapered section 52 in which it decreases in diameter, and the upper end of the bearing abuts against the wall of the bore at the start of the taper.

Female bearing 37 is mounted on male bearing 36 with the vertically extending inner surface 51a of side wall 51 in rotatable contact with the vertically extending outer surface 38b of side wall 38 and the horizontally extending lower surface 53 of bearing 37 in contact with the horizontally extending upper surface 54 of flange 39. The bearings are fabricated of a ceramic material or a surface hardened metal such as 316L stainless steel, and the hard surfaces of the two bearings allow the impeller to rotate freely about the post. Port holes 56, 57 in the upper and lower portions of the side wall 58 of the central section 27 of impeller 24 allow liquid from the vessel or tank to flow through that section and lubricate the bearings.

The impeller is driven by a drive shaft 59 which extends into the lower and middle sections of base 12 and is magnetically coupled to the impeller by drive magnets 61 on the shaft and driven magnets 62 on the impeller. In the embodiment illustrated, six drive magnets and six driven magnets are spaced equally about axis 14 with adjacent ones of the magnets having opposite polarities, both on the shaft and on the impeller. Thus, alternate ones of the drive magnets are oriented with their north poles facing outwardly in a radial direction, while the magnets between them have their south poles facing outwardly. Similarly, alternate ones of the driven magnets are oriented with their north poles facing inwardly, while the magnets between them have their south poles facing inwardly. The magnets are preferably rare earth magnets which produce strong magnetic fields.

Drive magnets 61 are mounted in axially extending recesses or slots 63 which open through the outer surface 64 of a section of enlarged diameter at the upper end of drive shaft 59 and are affixed to the shaft by mounting screws 66. The outer surfaces of the magnets are curved and flush with the outer surface of the shaft and disposed in close proximity to the inner wall 67 of the middle section 17 of base or post 12.

Driven magnets 62 are mounted in the lower section 26 of impeller 24, with concavely curved inner sides of the magnets abutting against the outer surface of inner wall 69 of the section. These magnets are fixed in place by bars 71, 72 on the other three sides of the magnets. These bars are affixed to an annular shoulder 74 at the upper end of the section and to an annular ring or plate 76 welded to inner wall 69 at the lower end of the section. The length of the bars and the spacing between the shoulder and plate correspond to the length of the magnets, and the magnets are constrained axially by the shoulder and plate. The lower section of the impeller also has an outer wall or sleeve 77 which is welded to the outer peripheries of shoulder 74 and plate 76 to form a sealed enclosure for the magnets.

The magnetic fields produced by the magnets lock the drive shaft and impeller together both axially and rotationally. In order to maximize the coupling forces, the drive magnets are positioned as close as possible to the driven magnets. Toward that end, the inner walls 67, 69 of the post and impeller are made as thin as possible and are positioned as close together as possible without interfering with rotation of the impeller about the post.

The drive shaft is driven by a motor/gearbox 79 which is attached to the lower section 16 of base 12 by housing sections 81, 82. The drive shaft extends downwardly through these sections and through an axially extending bore 83 in a hollow output shaft 84 in the motor/gearbox. The shafts are constrained for rotation together by an axially extending key 86 of generally rectangular cross section disposed in a keyway of similar cross section formed by axially extending slots 87, 88 in the inner surface of the output shaft and the outer surface of the drive shaft. This connection prevents relative rotation between the two shafts but allows axial movement of the drive shaft within the output shaft.

Means is provided for applying an upwardly directed force to drive shaft 59 to partially or fully offset downward forces exerted by impeller 24 on thrust bearing surfaces 53, 54 and thereby control friction between the two surfaces. Friction is governed by the relationship:

$$F_f = \mu F_n,$$

where $F_f$ is the magnitude of the friction, $\mu$ is the coefficient of friction, and $F_n$ is the magnitude of force normal to the surfaces. In this case, the rotating blades push up on the liquid, the liquid pushes down on the blades, and the impeller is rigidly connected to the female bearing. Therefore, the forces exerted on the thrust bearing surfaces by the impeller are due to a combination of the downwardly directed hydraulic forces and the mass of the impeller, with the hydraulic forces being dependent upon factors such as the viscosity and depth of the liquid being mixed, the speed of rotation, and the angles of the impeller blades. The upwardly directed force applied to the shaft is transferred to the impeller by coupling magnets 61, 62 which lock the impeller and shaft together both axially and rotationally.

In the embodiment illustrated, the force generator or means for applying the upwardly directed force comprises a pair of rare earth positioning magnets 91, 92 at the lower end of drive shaft 59. Magnet 91 rotates with the shaft and is mounted in an axially extending bore 94 in a shaft extender 96 which is affixed to the lower end of the drive shaft by a threaded rod or screw 97, with the upper end of the magnet seated against an annular shoulder 98 in the wall of the bore.

Figure 5:
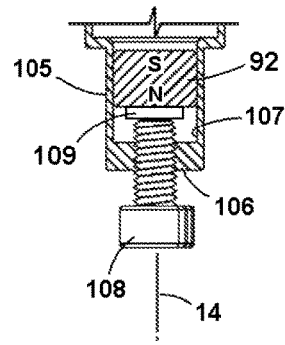
FIG. 5 is a fragmentary vertical sectional view of a portion of the structure shown in FIG. 4 with additional means for monitoring applied forces.
Figure 6:
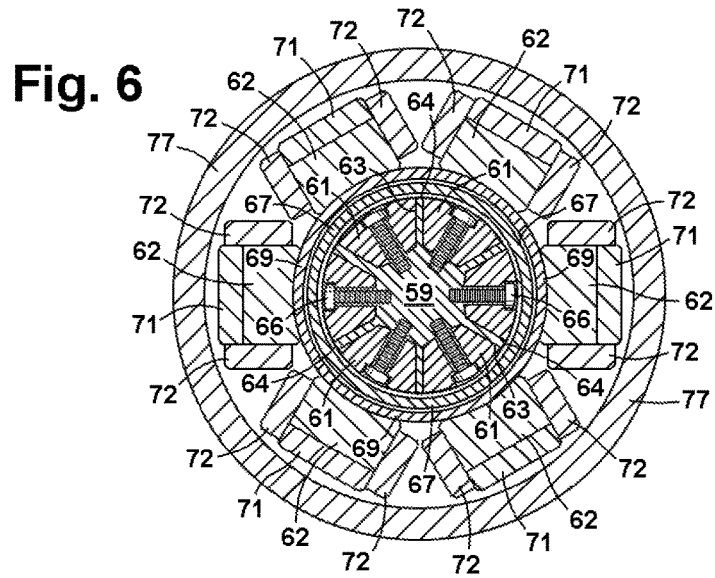
FIG. 6 is a cross-sectional view taken along line 6-6 in FIG. 2.
Figure 7:
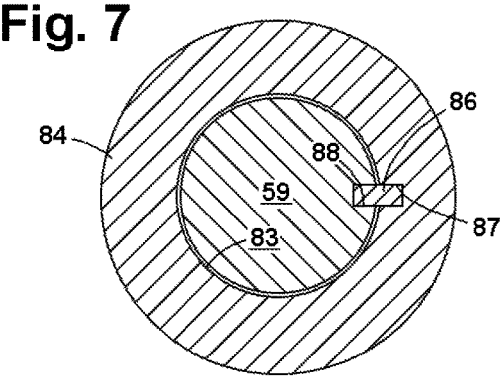
FIG. 7 is a cross-sectional view taken along line 7-7 in FIG. 4.

Magnet 92 is mounted in a stationary housing or holder 99 beneath the lower end of the drive shaft. The housing has an annular mounting flange 101 which is attached to the lower side of motor/gearbox 79 by mounting screws 102 and a cylindrical side wall 103 that depends from the flange. The side wall has an upper section 104 that surrounds and encloses the shaft extender, and a lower section 105 of lesser diameter, with a bottom wall 106 at the lower end of the side wall. Magnet 92 is slideably mounted in a cylindrical bore 107 in the lower section, with a screw 108 threadedly mounted in end wall 106 for adjusting the position of the magnet within the bore. If desired, a sensor such as a strain gauge 109 can be installed between the tip of the screw and the lower end of the magnet, as illustrated in FIG. 5, for monitoring the applied forces.

Drive shaft positioning magnets 91, 92 are oriented with like poles facing each other so that the magnetic fields produced by the two magnets interact to drive the magnets apart. Since the magnitude of the force is inversely proportional to the square of the separation or distance between the magnets, the force can be increased or decreased by turning screw 108 to adjust the position of magnet 92 along the axis. When the screw is advanced, the upper end of the screw bears against the lower end of the magnet, and the magnet advances toward magnet 91. The repelling fields hold magnet 92 in abutting engagement with the screw, and when the screw is retracted, the magnet retracts with it.

Even though friction between thrust bearing surfaces 53, 54 is significantly reduced by the upwardly directed force, those surfaces remain in full contact with each other throughout the operation of the mixer. With an offsetting force that, for example, is approximately 90 percent of the downward force of the impeller, the bearing surfaces will remain in contact but be affected by only about 10 percent of the impeller forces, and the friction will be only about 10 percent of what it would be without the offsetting force. The reduction in friction significantly increases the life of the bearings and substantially eliminates the generation of contaminating particles.

Alternatively, if desired, the offsetting force can be applied to the drive shaft by means other than an adjusting screw and magnets. Other suitable means might, for example, include springs, air cylinders, and solenoids, and such means can also be used instead of a screw for adjusting the position of the lower magnet. Another alternative is a stepper motor connected to the screw for dynamically adjusting the position of the lower magnet in accordance with a control signal corresponding to the load on the bearings.

The system is installed with the impeller in place and the thrust bearing surfaces fully engaged, with no space between them. The adjusting screw is then advanced to increase the upward force until the impeller starts to rise. At that point, the magnetic forces exceed the weight of the impeller, and the screw is then turned back or retracted a set amount until the bearing surfaces engage again. At that point the magnetic forces offset a substantial portion of the impeller's weight without the impeller being levitated. The applied force is thus controlled and customized for each individual system, and the bearing surfaces experience very light normal forces.

Figure 8:
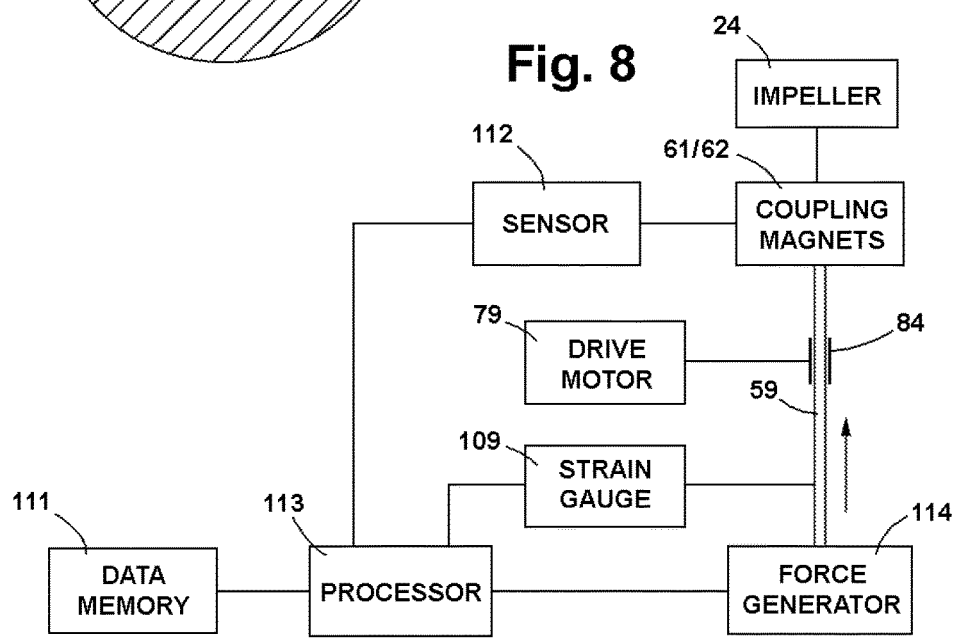
FIG. 8 is a block diagram of the embodiment of FIG. 1 with means for continuously adjusting the friction control during operation of the mixer.

In the embodiment illustrated in FIG. 8, the applied force is adjusted and controlled continuously during operation of the mixer to maintain a desired relationship between that force and the forces exerted by the impeller. In this embodiment, the forces required for different impeller speeds, liquid viscosities, and liquid depths are calculated, and this information is stored in a data memory 111. The impeller speed is monitored by a sensor 112 such as a magnetic pulse counter mounted in proximity to the rotating impeller magnets 62, and the upwardly directed force applied to drive shaft 59 is monitored by strain gauge sensor 109. The signals from the sensors are applied to a processor 113 along with information about the viscosity and depth of the liquid, and using that information and the data stored in memory, the processor determines the magnitude of the force to be applied and controls force generator 114 and the force applied to drive shaft 59 accordingly.

The force generator can, for example, consist of repelling magnets with means for adjusting the spacing between them, as in the embodiment of FIGS. 1-7, or it can be a stationary source that applies a controlled force to the drive shaft through ball bearings, PTFE friction bearings, or other suitable means.

In batch mixing operations, where changes occur in the liquid being mixed, with corresponding changes in the load applied to the impeller. The changes in load are reflected in the speed of the impeller which is monitored by sensor 112. Thus, for example, when heavy cream is mixed, at some point it will become butter which has a different load force on impeller, and the sensor provides a real time indication that process changes are occurring. This information is monitored by the processor which determines the magnitude of the force to be applied and can control force generator 114 and the force applied to drive shaft 59 on a continuous, dynamic basis during operation of the mixer.

The invention has a number of important features and advantages. It provides a magnetically coupled mixer in which friction between thrust bearings that support the impeller can be accurately controlled and significantly reduced without levitating the impeller. The thrust bearing surfaces remain in full contact with each other throughout the operation of the mixer, and with these surfaces in contact, the impeller cannot wobble about the post and damage the sleeve bearings on which it rotates.

Loading of the impeller by the liquid being mixed is monitored continuously, and forces that control the friction between the thrust bearings can be adjusted in accordance with the operating parameters on a real time basis to maintain a desired level of friction between the bearings. Determining process parameters according to impeller load is more sensitive and accurate than monitoring factors such as power consumption and torque to determine the process parameters from the load on a drive motor.

It is apparent from the foregoing that a new and improved magnetically coupled mixer has been provided. While only certain presently preferred embodiments have been described in detail, as will be apparent to those familiar with the art, certain changes and modifications can be made without departing from the scope of the invention as defined by the following claims.

The invention claimed is:

1. A mixer for an aseptic liquid, comprising a base having upper and lower end portions and an axially extending bore that opens through the lower end of the base, an impeller rotatably mounted on the upper portion of the base with horizontally extending, axially facing thrust bearing surfaces on the base and the impeller in load supporting, rotational contact with each other, an axially adjustable drive shaft that rotates within the bore, coupling magnets affixed to the drive shaft and impeller which produce interacting magnetic fields that constrain the impeller for rotational and axial movement with the drive shaft, and means operatively connected to the lower portion of the drive shaft for adjusting the axial position of the shaft to apply an upwardly directed, controlled force to the impeller to partially offset downward forces exerted by the impeller and thereby control friction between the rotating thrust bearing surface on the impeller and the stationary thrust bearing surface on the base while maintaining contact between them.

2. The mixer of claim 1 wherein the base extends through an opening in a wall of a vessel and is sealed to the wall, with the upper portion of the base inside the vessel and the lower portion of the base outside the vessel.

3. The mixer of claim 1 wherein the upwardly directed force has a magnitude that is approximately 90 percent of the magnitude of the downward forces exerted by the impeller.

4. The mixer of claim 1 wherein the means for adjusting the axial position of the drive shaft comprises a first magnet affixed to the shaft, a second magnet mounted in a holder in proximity to the first magnet with an orientation such that magnetic fields produced by the two magnets interact to exert an upwardly directed force on the shaft, and means for adjusting the proximity of the two magnets to control the magnitude of the upwardly directed force.

5. The mixer of claim 4 wherein the first magnet is affixed to the lower end of the shaft, and the holder is positioned beneath the shaft with the magnets in axial alignment and oriented such that the fields they produce interact to urge the magnets apart.

6. The mixer of claim 5 wherein the second magnet is mounted in an axially extending bore in the holder, with an adjusting screw bearing against the lower side of the second magnet to determine the distance between the first and second magnets.

7. The mixer of claim 6 including a strain gauge sensor disposed between the second magnet and the adjusting screw, and means responsive to readings of the strain gauge sensor for controlling the magnitude of the upwardly directed force applied to the impeller.

8. The mixer of claim 1 including a sensor that provides a signal corresponding to the downward forces exerted by the impeller, and means responsive to the sensor signal for controlling the magnitude of the upwardly directed force applied to the impeller.

9. The mixer of claim 8 wherein the sensor is a pulse counter responsive to the rotating magnetic fields produced by the coupling magnets.

10. The mixer of claim 1 wherein the controlled force applied to the impeller is continuously adjusted in response to real time measured forces.

11. The mixer of claim 1 wherein the drive shaft extends vertically, and the vertical position of the drive shaft is dynamically controlled and continuously monitored.

12. The mixer of claim 1 wherein the drive shaft extends vertically, and the vertical position of the drive shaft is dynamically controlled and continuously adjusted by a controller.

13. A mixer for an aseptic liquid, comprising a post which extends through an opening in a wall of a vessel and is sealed to the wall with an upper portion of the post inside the vessel and a lower portion of the post outside the vessel, an impeller rotatably mounted on the upper portion of the post with horizontally extending, axially facing thrust bearing surfaces on the post and the impeller in load supporting, rotational contact with each other, an axially adjustable drive shaft that rotates within a bore in the post, coupling magnets affixed to the drive shaft and impeller which produce interacting magnetic fields that constrain the impeller for rotational and axial movement with the drive shaft, a first shaft positioning magnet affixed to the lower end of the drive shaft, a second shaft positioning magnet spaced beneath the first with an orientation such that magnetic fields produced by the two positioning magnets repel and exert an upwardly directed force on the shaft, and means for adjusting the spacing between the two positioning magnets so that the upwardly directed force at least partially offsets downward forces exerted by the impeller and thereby reduces friction between the rotating thrust bearing surface on the impeller and the stationary thrust bearing surface on the post while maintaining contact between them.

14. The mixer of claim 13 wherein the second shaft positioning magnet is mounted in an axially extending bore in a holder mounted in a fixed position beneath the drive shaft, and the holder includes an axially extending adjusting screw which determines the position of the second positioning magnet within the holder bore.

15. The mixer of claim 14 including a strain gauge sensor disposed between the second shaft positioning magnet and the adjusting screw, and means responsive to the strain gauge sensor for controlling the magnitude of the upwardly directed force applied to the impeller.

16. The mixer of claim 13 wherein the upwardly directed force has a magnitude that is equal to approximately 90 percent of the magnitude of the downward forces exerted by the impeller.

17. The mixer of claim 13 wherein the drive shaft can be adjusted axially during normal operation of the mixer.

18. The mixer of claim 13 including a sensor that provides a signal corresponding to the downward forces exerted by the impeller, and means responsive to the sensor signal for controlling the magnitude of the upwardly directed force applied to the impeller.

19. The mixer of claim 18 wherein the sensor is a pulse counter responsive to the rotating magnetic fields produced by the coupling magnets.

20. The mixer of claim 13 wherein the spacing between the two positioning magnets is continuously adjusted in response to real time measured forces.

21. The mixer of claim 13 wherein the drive shaft extends vertically, and the vertical position of the drive shaft is dynamically controlled and continuously monitored.

22. The mixer of claim 13 wherein the drive shaft extends vertically, and the vertical position of the drive shaft is dynamically controlled and continuously adjusted by a controller.

23. A mixer for an aseptic liquid, comprising a base having upper and lower end portions and an axially extending bore that opens through the lower end of the base, an impeller rotatably mounted on the upper portion of the base with horizontally extending, axially facing thrust bearing surfaces on the base and the impeller in load supporting, rotational contact with each other, an axially adjustable drive shaft that rotates within the bore, coupling magnets affixed to the drive shaft and impeller which produce interacting magnetic fields that constrain the impeller for rotational and axial movement with the drive shaft, a sensor for monitoring downward forces exerted by the impeller, and means responsive to the sensor for adjusting the axial position of the drive shaft to apply an upwardly directed force to the impeller to at least partially offset downward forces exerted by the impeller and thereby reduce friction between the rotating thrust bearing surface on the impeller and the stationary thrust bearing surface on the base while maintaining contact between them.

24. The mixer of claim 23 wherein the sensor comprises a magnetic pulse counter responsive to the rotating magnetic fields produced by the coupling magnets, and the means for adjusting the position of the drive shaft to apply the force comprises a processor for determining the magnitude of the downward forces exerted by the impeller from the rotational speed of the impeller, and means controlled by the processor for adjusting the position of the drive shaft.

25. The mixer of claim 24 wherein the means for adjusting the position of the drive shaft includes a first magnet affixed to the shaft, a second magnet positioned in proximity to the first with an orientation such that the magnetic fields produced by the two magnets repel each other and exert an upwardly directed force on the shaft, and means for adjusting the distance between the two magnets to control the magnitude of the upwardly directed force.

26. The mixer of claim 23 wherein the base extends through an opening in a wall of a vessel and is sealed to the wall, with the upper portion of the base inside the vessel and the lower portion of the base outside the vessel.

27. The mixer of claim 23 wherein the upwardly directed force has a magnitude that is approximately 90 percent of the magnitude of the downward forces exerted by the impeller.

28. The mixer of claim 23 wherein the force applied to the impeller is monitored by a strain gauge sensor and is a factor in adjusting the axial position of the drive shaft.

29. The mixer of claim 23 wherein the upwardly directed force applied to the impeller is continuously adjusted in response to real time measured forces.

30. The mixer of claim 23 wherein the drive shaft extends vertically, and the vertical position of the drive shaft is dynamically controlled and continuously monitored.

31. The mixer of claim 23 wherein the drive shaft extends vertically, and the vertical position of the drive shaft is dynamically controlled and continuously adjusted.

32. A mixer for aseptic liquids, comprising an impeller which rotates about a vertically extending axis and is supported by horizontally extending thrust bearing surfaces in rotational contact with each other, an axially movable drive shaft operably coupled to the impeller, and means for adjusting the axial position of the drive shaft to apply an upwardly directed force to the impeller to at least partially offset downwardly directed forces that would otherwise be applied to the horizontally extending thrust bearing surfaces by the impeller.

33. The mixer of claim 32 wherein the drive shaft is magnetically coupled to the impeller.

* * * * *